(12) United States Patent
Shenfield (10) Patent No.: US 7,743,075 B2
(45) Date of Patent: Jun. 22, 2010

(54) METHOD AND SYSTEM FOR ORCHESTRATION OF CONTENT PROCESSING IN MOBILE DELIVERY FRAMEWORKS

(75) Inventor: Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 593 days.

(21) Appl. No.: 11/690,329

(22) Filed: Mar. 23, 2007

(65) Prior Publication Data

US 2009/0037438 A1 Feb. 5, 2009

(51) Int. Cl.
*G06F 17/30* (2006.01)
(52) U.S. Cl. ...................................... 707/802
(58) Field of Classification Search .......... 707/100–101
See application file for complete search history.

(56) References Cited

U.S. PATENT DOCUMENTS

| 2004/0073613 | A1 | 4/2004 | Plewnia |
| 2005/0240530 | A1 | 10/2005 | Watanabe et al. |
| 2006/0015568 | A1* | 1/2006 | Walsh et al. ............. 709/217 |
| 2008/0137688 | A1* | 6/2008 | Walsh ..................... 370/498 |

OTHER PUBLICATIONS

Henrik Frystyk Nielsen et al: "Web Services Routing Protocol (WS-Routing)" Internet Citation, [Online] 2001, XP002427675 Retrieved from the Internet: URL:http://msdn2.microsoft.com/en-us/libra.

\* cited by examiner

*Primary Examiner*—Cheryl Lewis
(74) *Attorney, Agent, or Firm*—Moffat & Co.

(57) ABSTRACT

A method and system for coordinating content processing in a mobile delivery framework, the method having the steps of embedding, within a metadata envelope associated with content, external references to external enablers; and inserting content processing coordination rules into the metadata envelope.

27 Claims, 7 Drawing Sheets

METHOD AND SYSTEM FOR ORCHESTRATION OF CONTENT PROCESSING IN MOBILE DELIVERY FRAMEWORKS

FIELD OF THE DISCLOSURE

The present disclosure relates to mobile content delivery and in particular to the utilization of enablers to facilitate mobile content delivery.

BACKGROUND

The users of mobile devices or mobile user equipment (UE) are increasingly becoming more sophisticated in terms of the functionality that they require from their mobile devices and the way that they access data from the mobile devices.

Dynamic content delivery allows users to have subscribed information or data dynamically delivered to them rather than having to go and seek out the data. Examples of data could include stock quotes, weather updates, traffic updates, dynamic wallpaper, ads, applications or other data desirable to the user.

Content delivery often requires various enablers on both the server side and on the device side. These enablers are not part of the core functionality of a delivery enabler and a system and method is required in order to coordinate content processing with other enablers.

BRIEF DESCRIPTION OF THE DRAWINGS

The present disclosure will be better understood with reference to the drawings in which.

DETAILED DESCRIPTION

The present system and method provide for the embedding of external references and content processing coordination rules inside mobile content delivery metadata. In particular, a method is provided for expressing coordination rules for mobile delivery metadata as an XML packaged state chart.

A content provider embeds metadata for various processing elements within the delivery framework. Included in the metadata are instructions for the content delivery enabler. Further, external namespace declarations are provided for external enablers. Namespaces referring to the XML schemas representing binding to external enablers are included in order to coordinate processing of mobile content while a content package is being delivered. This is accomplished by embedding elements and attributes defined in corresponding XML schemas within an XML element for the processing state.

Action verbs can be used to map coordination instructions to external enabler functions. This level of indirection allows for low coupling between services.

The present disclosure therefore provides a method for coordinating content processing in a mobile delivery framework comprising the steps of: embedding, within a metadata envelope associated with content, external references to external enablers; and inserting content processing coordination rules into the metadata envelope.

The present disclosure further provides a system for coordination of content processing comprising: a content provider, said content provider adapted to embed external references and content processing coordination rules inside mobile content delivery metadata associated with content supplied by said content provider; a content delivery enabler comprising: a delivery server, said delivery server adapted to process metadata directed to said delivery server; and a delivery client, said delivery client adapted to process metadata directed to said delivery client; external enablers adapted to process content based on the content processing coordination rules through said content delivery enabler; and a content client adapted to consume content from the content provider.

The present disclosure further provides a content package comprising: content; and a metadata envelope, the metadata envelope having external references to external enablers and content processing coordination rules embedded therein.

Figure 1:
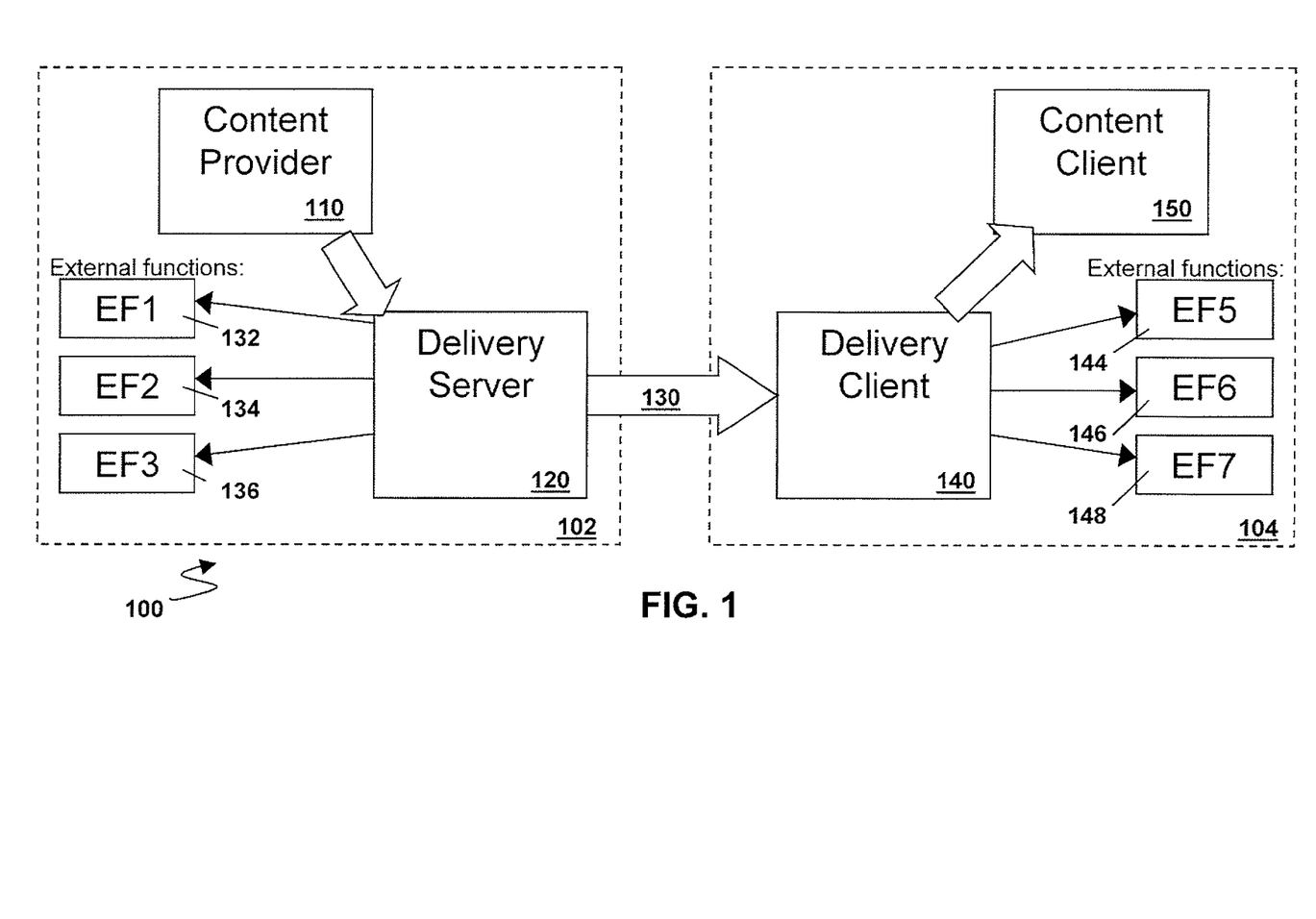
FIG. 1 is a block diagram showing logical components within a delivery architecture.

Reference is now made to FIG. 1. A push system for delivering dynamic content to a client application is illustrated. The system of FIG. 1 is a simplified system and shows logical components that need to be in a dynamic content delivery architecture. However, as will be appreciated by those skilled in the art, other components could exist or various components could be grouped together.

Architecture 100 includes a content provider 110. Content provider 110 is arranged to provide dynamic content to users. This can include, for example, a website selling books. Content provider 110 may periodically provide a list of newly released books which can either be sent to subscribers that are subscribed to the website or to a delivery server that manages the subscriptions.

A delivery server 120 communicates over a wireless network 130 with a delivery client 140 that is located on a mobile device in a preferred embodiment. Delivery client 140 receives the content that is being delivered from content provider 110 and can communicate the content with a content client 150. Content client 150 ultimately consumes the content.

As will be appreciated by those skilled in the art, an enabler in the present disclosure is equivalent to a framework. Thus, the delivery enabler comprises delivery server 120 and delivery client 140.

As will be appreciated by those skilled in the art, various external functions may be required for the delivery of the content to the content client 150. These external functions can exist both on the server side 102 and the device side 104. In FIG. 1, the external functions are shown as external functions 132, 134 and 136 on server side 102 and external functions 144, 146 and 148 on device side 104. Examples of external functions can include but are not limited to presence, location, content screening, and compression, among others.

Figure 2:
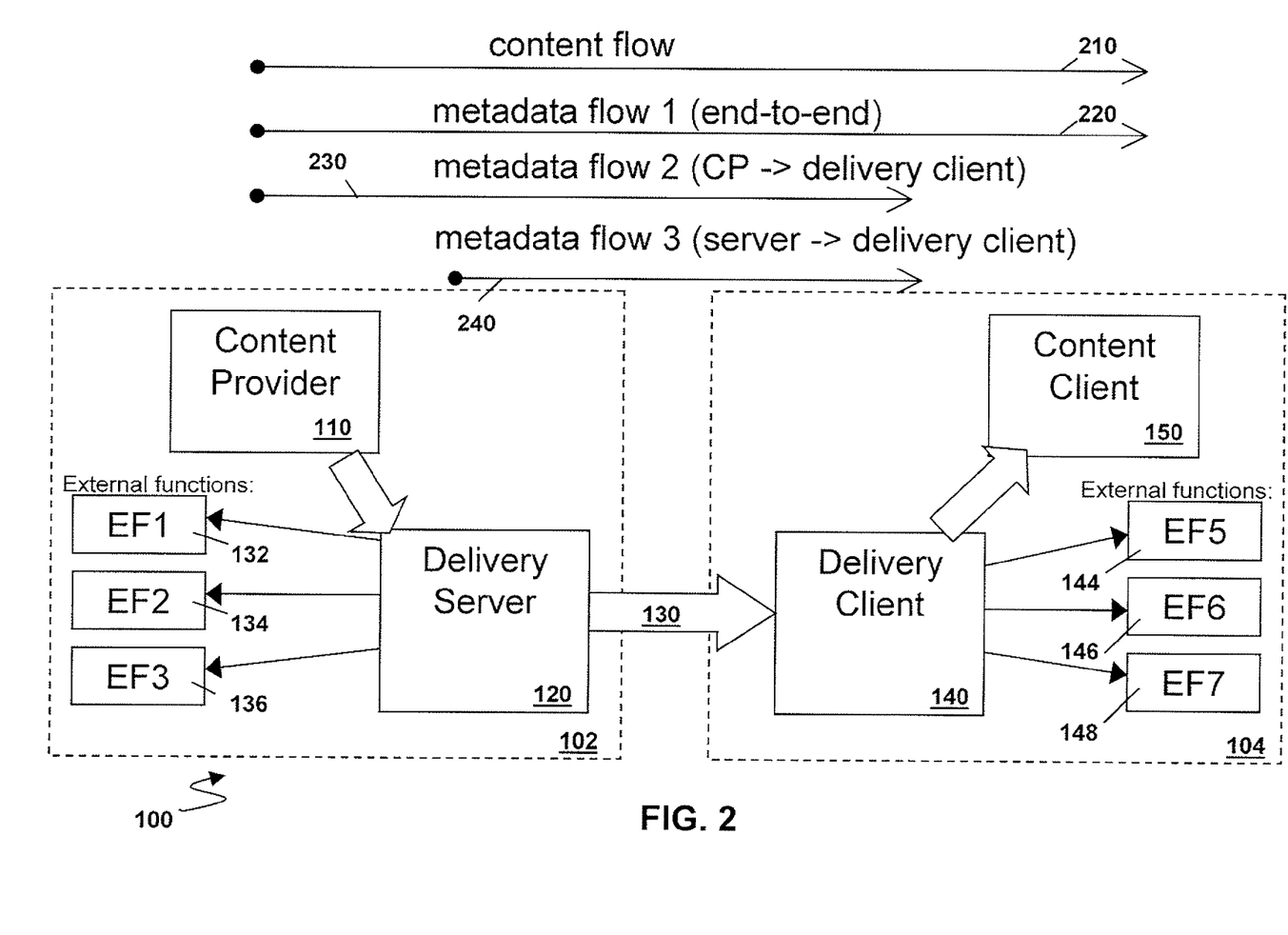
FIG. 2 is a block diagram illustrating flow of metadata between the logical components of FIG. 1.

Reference is now made to FIG. 2. In order to add intelligence to a system, content is associated with metadata. Metadata, in this case, is defined as data that can be used by a processing element to manipulate the content. As will be appreciated, a generic content delivery system requires metadata to allow various content providers and content clients to exist within the system. The metadata can be in various forms, including processing parameters or rules, or a processing handler, code or reference provided directly or a link to a processing handler, code or rules in another location.

As can be seen in FIG. 2, content passes from content provider 110 to content client 150, as illustrated by arrow 210. Metadata, which provides instructions to various components within the architecture 100 can also pass between components within architecture 100, usually along with the content. For example, arrow 220 illustrates metadata for the content client that originates at the content provider 110 and is opaque to the delivery system until it reaches a content client 150.

Arrow 230 shows metadata created by a content provider 110 that is intended for delivery client 140 and thus only flows to the delivery client 140.

Arrow 240 illustrates metadata generated by delivery server 120 and is intended for delivery client 140 and thus is first associated with the content at delivery server 120 and stripped from the content at delivery client 140. Examples of where this could occur include agreements between a user and a service provider regarding a billing plan and the level of service to be provided, where the service provider can use the metadata to limit the services available or provide enhanced services.

Figure 3:
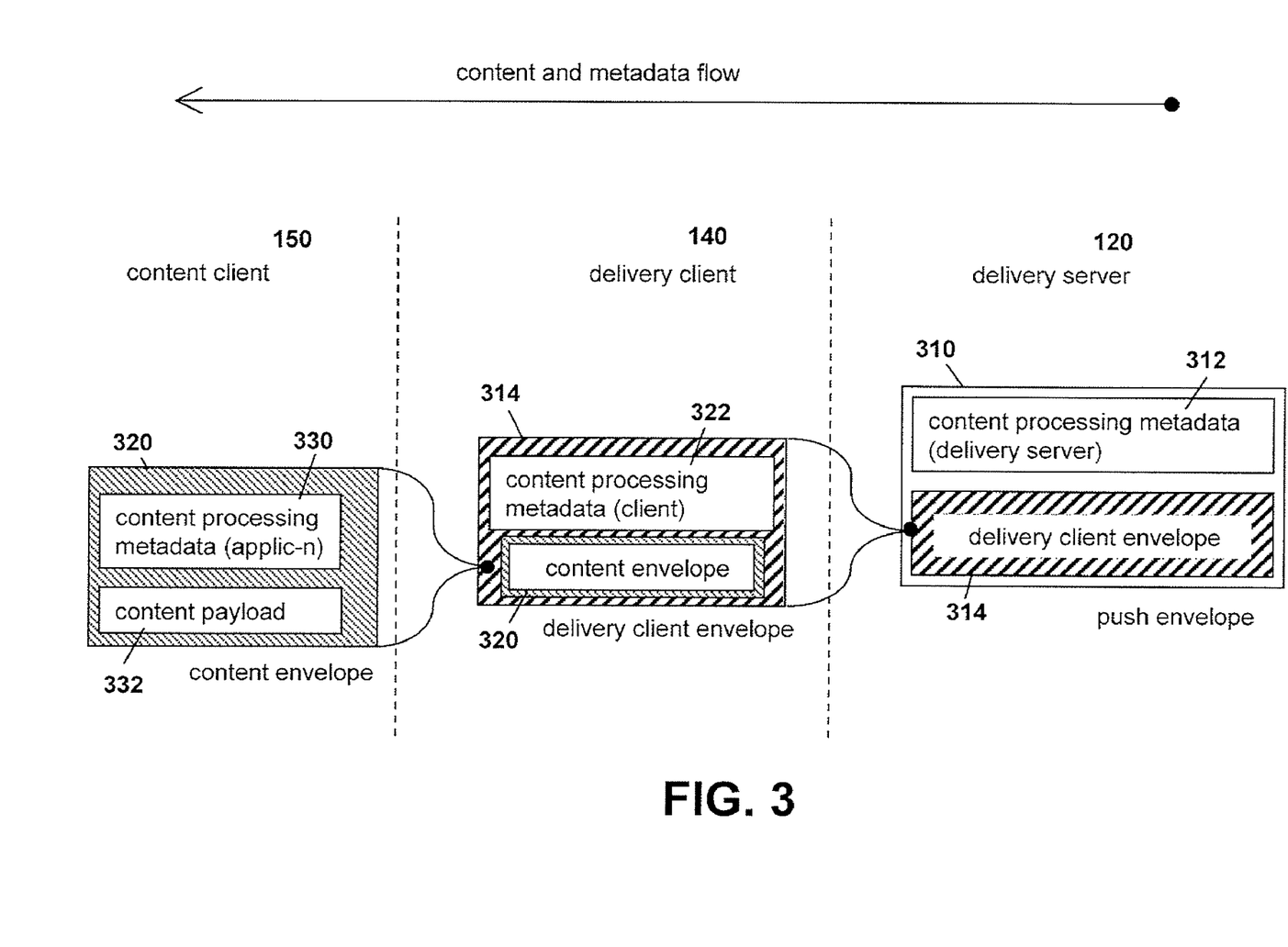
FIG. 3 is a block diagram illustrating an enveloped model for metadata processing between the logical components of FIG. 1.

Reference is now made to FIG. 3. FIG. 3 illustrates a multilayered envelope model for content metadata.

A delivery server 120 receives a push envelope 310 that includes content processing metadata 312 for the delivery server 120 and a delivery client envelope 314. The delivery server 120 extracts the content processing metadata 312 and uses this metadata to process delivery client envelope 314. Metadata 312 dictates to delivery server 120 what to do with the delivery client envelope 314.

Delivery client envelope 314 is passed to delivery client 140, where it is broken into a content envelope 320 and a content processing metadata 322. Content processing metadata 322 is used by delivery client 140 to process the content envelope 320. For example, this can be used to instruct delivery client 140 to perform a replacement of previously delivered content envelope 320 with the latest envelope if content client 150 is only interested in the latest version of the content.

Content envelope 320 is passed to content client 150. Content envelope 320 includes content processing metadata 330 for the content client 150 and content payload 332 that is to be consumed by the content client 150.

As will be appreciate by those skilled in the art, the nesting of envelopes in accordance with FIG. 3 provides for a rich dynamic environment in which processing can occur at any processing element of the architecture and in which the content provider 110 can specify how specific content is to be dealt with. In one embodiment, metadata is directed to a particular logical element and is opaque to other processing elements.

As will further be appreciated, metadata may only be included for various stages of the delivery of content. For example, metadata may only be required between the delivery server 120 and delivery client 140 and thus no metadata for content client 150 would be included.

Other alternatives would be evident to those skilled in the art.

While the above describes metadata for a content delivery enabler, in some cases a mobile content delivery enabler may need to engage other frameworks and enablers while delivering content to a content client 150. Similarly, a delivery enabler may need to engage other frameworks and enablers while delivering the content to content client 150. As indicated above, examples of external functions include presence, location, content screening, compression, among others. For example, an external enabler may be a presence enabler. A user may have specified a rule that certain content should only be delivered when the user is in a home network in order to avoid data roaming charges. Such an enabler needs to use the functionality of other enablers such as a location enabler to find where the mobile device is located.

Other examples of enablers include content screening that could prevent certain types of content from being delivered to the mobile device.

On the device side, an example of an enabler may be a compression enabler that would need to decompress certain content before it is passed to a content client 150.

A content delivery enabler would not typically have the functionality of the external enablers and thus needs to access external enablers to provide for a rich content delivery framework.

As will be appreciated by those skilled in the art, content should be opaque for the delivery framework. The only way to therefore indicate the need for external content processing and to coordinate this processing is through the use of metadata.

Figure 4:
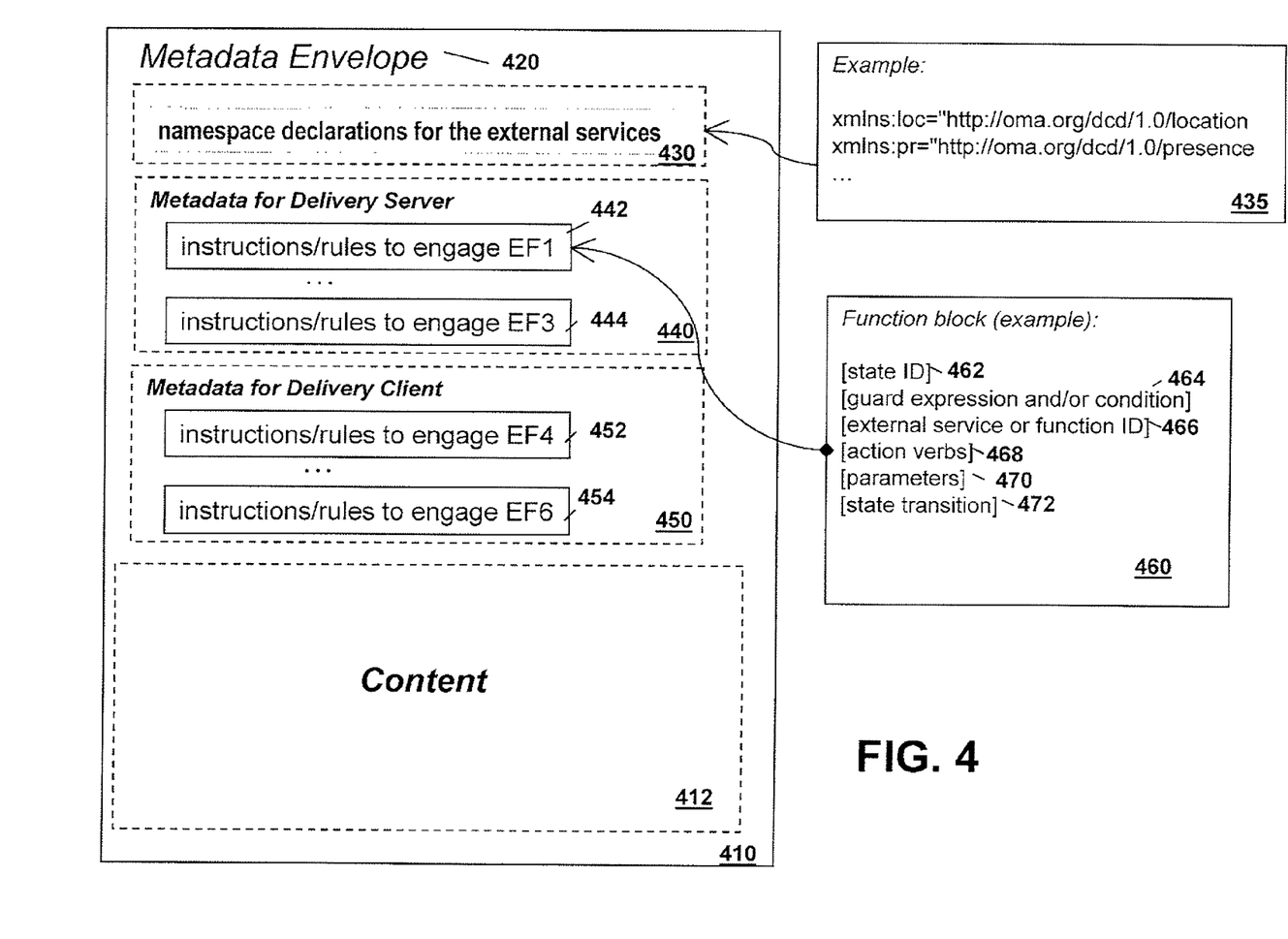
FIG. 4 is a block diagram showing an exemplary content package including content and a metadata envelope.

Reference is now made to FIG. 4. FIG. 4 illustrates an exemplary content package 410 received from a content provider such as content provider 110 from FIG. 1.

Content package 410 includes content 412 and a metadata envelope 420. As indicated above, content 412 should be opaque for the delivery framework. Therefore, the only way to indicate the need for external content processing, and to co-ordinate this processing, is through the use of the metadata in metadata envelope 420.

Metadata envelope 420 includes a namespace declaration box 430, which allows for namespace declarations for external services that are to be used for processing the content 412. Two exemplary namespace declarations are shown with reference numeral 435.

Metadata envelope 420 further preferably includes a metadata block 440 for processing by a delivery server such as delivery server 120 from FIG. 1.

Metadata block 440 includes various metadata for processing by the delivery server. Metadata block 440 further includes various function blocks to engage external functions. These are illustrated by function blocks 442 and 444 in FIG. 4.

Metadata envelope 420 also includes a metadata block 450 for processing by a delivery client such as delivery client 140 from FIG. 1. Metadata block 450 includes metadata to be processed by the delivery client along with function blocks 452 and 454.

As will be appreciated by those skilled in the art, the use of two function blocks to engage external functions in block 450 is merely an example and the present disclosure is not meant to be limited to a certain number of external functions engaged by external function blocks. In other words, metadata block 440 or metadata block 450 could include no instructions or rules to engage external functions and thus no function blocks, or could engage multiple external functions through many function blocks.

An example of a function block, such as function block 442, is illustrated by reference numeral 460. Reference numeral 460 points to a logical representation of a function block. In the example of FIG. 4, the function block is a node in a state tree.

The function block preferably includes a state identifier 462, which identifies the state of the function block in state tree.

The function block may further include a guard expression and/or condition 464, which includes a logical expression that, if satisfied, causes the processing for the state to be performed.

The function block further could include an external service or function identifier 466 to identify the external service or function being utilized.

The function block could further include action verbs 468 defining what function of an external service the content delivery enabler should use.

The function block could further include parameters 470 defining the list of parameters that needed to be passed to the external enabler when the function defined in this function block is invoked.

The function block could further include a state transition 472 based on the results of the action verbs to indicate which state to move to next.

Figure 5:
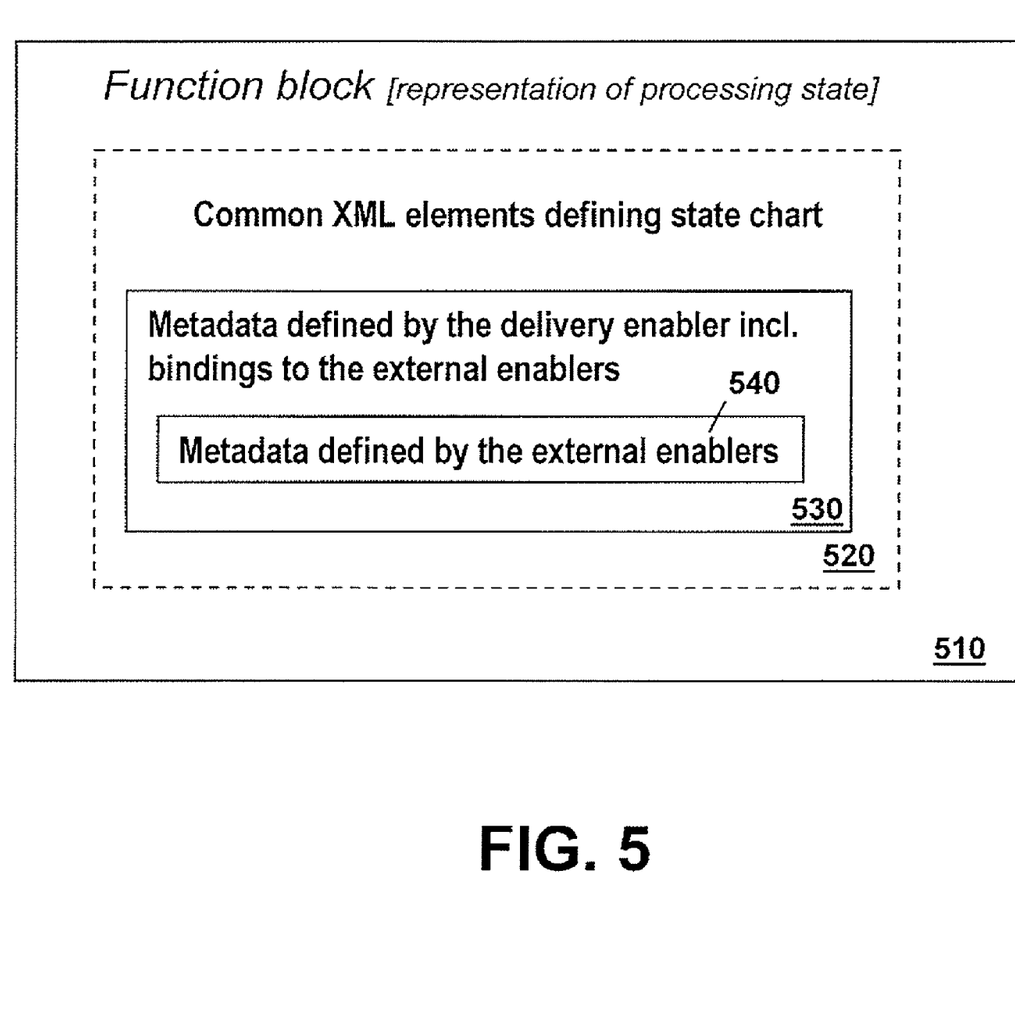
FIG. 5 is a block diagram showing a function block.

Reference is now made to FIG. 5. FIG. 5 illustrates a layered structure of function block 510, which is a representation of a processing state. Various embedded blocks exist within function block 510 as described below.

A first block 520 is a set of common XML elements defining state chart. As will be appreciated by those skilled in the art, the term "element" is a broad term and includes a subset of an XML document that starts and ends with corresponding XML tags.

Block 520 includes elements that are referenced by the namespace defining XML syntax for a state chart representation language. Examples include state chart extensible markup language (SCXML), business process execution language (BPEL) and XProc, among others.

A further embedded block 530 contains metadata defined by the delivery enabler, including bindings to external enablers. Block 530 includes XML that is referenced by the namespace for the delivery enabler and includes all XML bindings to external enablers and internal processing instructions, if any.

A further embedded block 540 is metadata defined for use by external enablers. This block is referenced by the namespace for the external enabler and includes elements defined in the external enabler schema. These elements are opaque for the delivery enabler.

As will be appreciated by those skilled in the art, the elements within block 530 specify a predefined behavior of the delivery enabler including binding of elements onto functions/parameters of the external enabler. These elements should be understood by the delivery enabler metadata interpretation layer. Conversely, the elements within block 540 are opaque for the delivery enabler and are passed to the external enabler "as is". These elements represent constructs defined by the external enabler schema and therefore are understood by the external enabler.

The above therefore provides a method for using name spaces and schemas representing bindings to external enablers in order to coordinate processing of mobile content while in delivery. This is accomplished by embedding elements defined in corresponding schemas within an XML element for the processing state.

Figure 6:
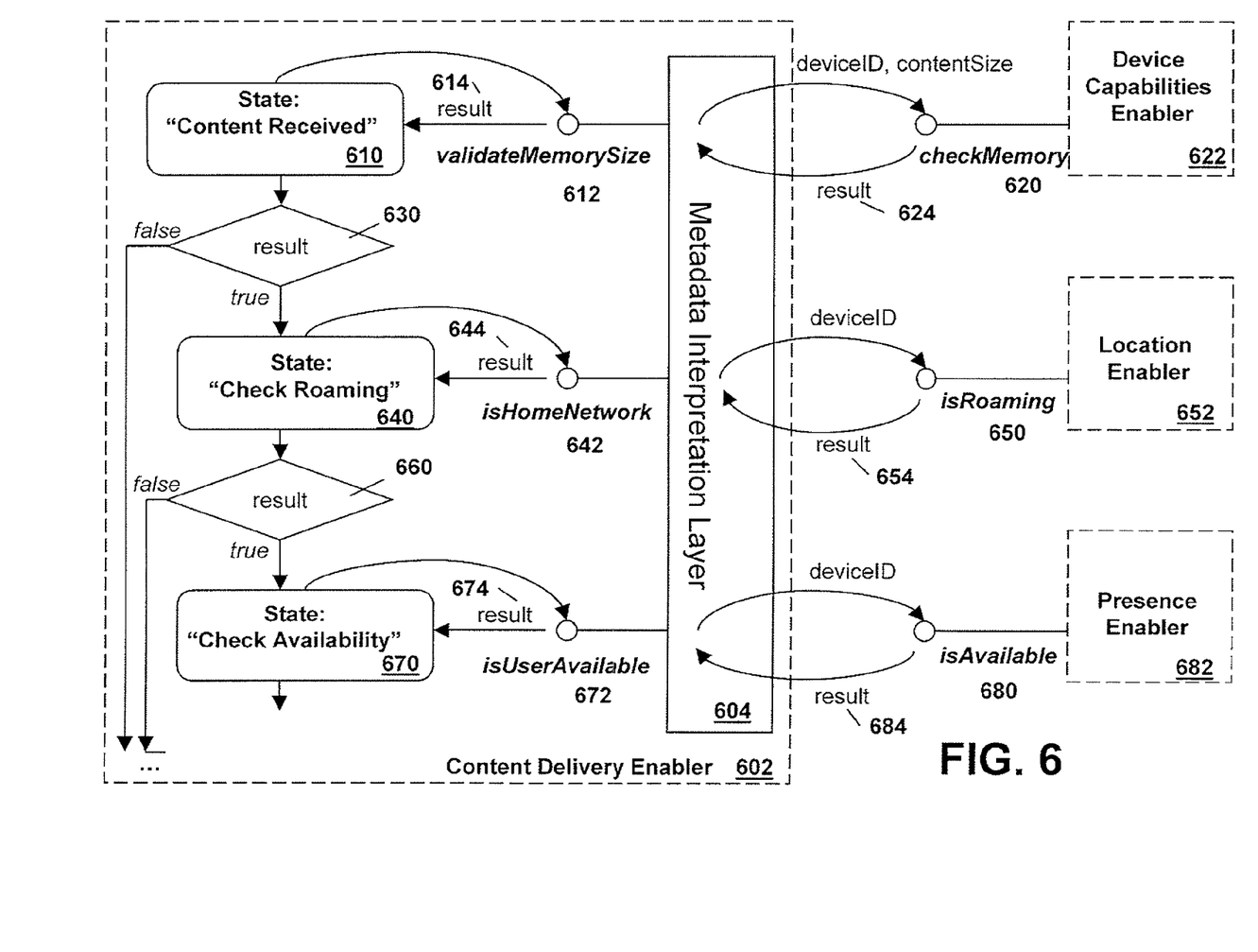
FIG. 6 is a state diagram showing exemplary coordination of metadata between a content delivery enabler and external enablers.

The above will be more clearly understood with reference to the following example SCXML code segment and reference to FIG. 6.

The following illustrates an example of co-ordination metadata expressed in SCXML:

```
<scxml  xmlns="http://www.w3.org/2005/07/scxml"
        xmlns:dcd="http://oma.org/dcd/1.0"
        xmlns:dp="http://oma.org/dcd/1.0/dcap"
        xmlns:l="http://xyz.com/location/1.0/"
        xmlns:p="http://abc.net/presence/1.0/"
        initialstate="Content Received">
<state id="Content Received">
    <invoke src="checkMemory">
        <dcd:action function-id="DCAP:checkMemory">
            <dcd:verb>validateMemorySize</dc:verb>
            <dcd:param>ContentHeader:deviceID<dcd:param>
            <dcd:param>ContentHeader:contentSize<dcd:param>
            <dp:function>checkMemory</dp:function>
            <dp:resultType>boolean</dp:resultType>
        </dcd:action>
    </invoke>
    <transition event="success" cond="checkMemory.result" target="Check Roaming"/>
    <transition event="failure" cond="!checkMemory.result" target="Check Fragmentation"/>
</state>
<state id="Check Roaming">
    <invoke src="isRoaming">
        <dcd:action function-id="LOC:isRoaming">
            <dcd:verb>isHomeNetwork</dcd:verb>
            <dcd:param>ContentHeader:deviceID<dcd:param>
            <dcd:someExoticElement>"if not in Finland"<dcd:someExoticElement>
            <l:name>isRoaming</l:name>
            <l:param>"ignoreNetworkAgreements=true"</l:param>
        </dcd:action>
    </invoke>
    <transition event="success" cond="isRoaming.result" target="Check Availability"/>
    <transition event="failure" cond="!isRoaming.result" target="Send Rejected"/>
</state>
<state id="Check Availability">
    <invoke src="isAvailable">
        <dcd:action function-id="PRES:isAvailable">
           ...
        </dcd:action>
   ...
</scxml>
```

The first five lines of the code segment above are part of block 430 from FIG. 4. Specifically, these are namespace declarations for the XML version, as well as namespace declarations for the dynamic content delivery, a device capabilities enabler, a device location enabler and a device presence enabler. As will be appreciated, these are merely examples of various enablers that could be used and declared as part of the namespace declarations. Further, the namespaces declarations shown above are merely included as an example and do not represent real URLs for enablers.

The next line of the code indicates 'initialstate="content received"'. This shows the initial state to proceed to for the content processing.

The next line indicates 'state id="content received"'. This is part of block 520 of FIG. 5 and defines the state of the function block.

Further, the line 'invoke src="checkMemory"' is part of block 520 of FIG. 5 and is telling the SCXML to invoke an external function.

The next line indicates 'dcd:action function-id="DCAP:checkMemory"'. This action defines that the external function checkMemory on the delivery capabilities enabler should be utilized.

The next line is <dcd:verb>validateMemorySize</dcd:verb>. This is an action verb that the dynamic content delivery enabler understands.

The next two lines indicate parameters that the external function checkMemory uses.

The next line is <dp:function>checkMemory</dp:function>. This maps the dcd action verb validateMemorySize to the external function. In this case, the external function is checkMemory and is part of the device capability enabler defined using the name "dp" in the namespace definition.

The next line defines the results type that is expected from the external function.

From the above code segment, the dcd:action, dcd:verb and dcd:parameters belong to block 530 of FIG. 5. These are a predefined behavior of the delivery enabler and include binding of the elements onto functions or parameters of the external enabler.

The lines dp:function and dp:result belong to block 540 and are opaque to the dcd enabler.

The line: <transition event="success" cond="checkMemory.result" target="Check Roaming"/> is a check to see whether or not a specific event occurred and a condition has been satisfied. If the event has occurred and the condition has been satisfied, then this line defines the next state to proceed to. In this case, the next state is "Check Roaming".

In the line <transition event="failure" cond="!isRoaming.result" target="Send Rejected"/> the event fails and the check memory returns 'false', then the state proceeds to "Check Fragmentation".

As will be appreciated by those skilled in the art, the transition events defined above belong to block 520 of FIG. 5.

Referring to FIG. 6, the above is illustrated with reference to the state diagrams. Specifically, the initial state 610 is state: "Content Received". An action verb validateMemorySize is used within content delivery enabler 602 and is interpreted at the metadata interpretation layer 604.

In metadata interpretation layer 604, the external function checkMemory 620 is invoked, passing device parameters 'deviceID' and 'contentSize'. Device capabilities enabler 622 then returns a result 624 back to metadata interpretation layer 604, which then passes the parameter back through the validateMemorySize 612 verb, and the result 614 is passed back into state 610.

The result 614 is checked at step 630 and if true, the state transitions to "Check Roaming" state 640 and if false, the state transitions to a "Check Fragmentation" state [not shown].

Referring again to the code segment above, a further function block is defined by 'state ID="check roaming"'.

The action is defined for the dynamic content delivery using function ID "LOC:isRoaming".

The expression <dcd:verb>isHomeNetwork</dcd:verb> provides an action verb. The parameters for the action verb are defined in the next line as ContentHeader:deviceID.

The dynamic content delivery can use any arbitrary elements defined in its schema such as the expression "someExoticElement".

The next two lines, namely:
<I:name>isRoaming</I:name>
<I:param>"ignoreNetworkAgreements=true"</I:param> define an external function that is mapped to the verb "isHomeNetwork". The external function is the "is Roaming" function and includes a parameter of "ignoreNetworkAgreements". As will be appreciated by those skilled in the art, the location enabler is adapted to handle this function and the function is opaque to the dynamic content delivery enabler.

The next two lines define the transitions. If the "is Roaming" returns a true, then the state transition transitions to a check availability state. If the "is roaming" result is false, then the state transitions to a "Send Rejected" state.

This is illustrated in FIG. 6. In FIG. 6, the state 640 is the "Check Roaming" state and the action verb 642 "isHomeNetwork" can be used from the state 640. Metadata interpretation layer 604 interprets the "isHomeNetwork" and uses the action verb to invoke an "is Roaming" function 650 at a location enabler 652.

Location enabler 652 returns a result 654, which is propagated through metadata interpretation layer 604 to the "is HomeNetwork" verb 642, which returns a result 644 to the check roaming state 640.

The result is then checked at 660, which corresponds to the "transition" commands in the code above. If the result in 660 is true, the state transitions to state 670 to a "Check Availability" state. Otherwise, the state proceeds to a "Send Rejected" state [not shown].

Similar functionality applies for the state 670. The action verb in this case is "isUserAvailable". The metadata interpretation layer 604 uses the "isUserAvailable" verb 672 and invokes the "is Available" function 680 of presence enabler 682. A result 684 is returned and is then returned as a result 674 to state 670. Based on this, a state transition may occur.

The above therefore provides a method for using external action groups to map coordination instructions to external enabler functions. An interpretation layer for mapping action verbs defined in the delivery enabler onto external functions allows low coupling between services.

As will be appreciated by those skilled in the art, the coordination metadata is defined using XML representation of a state diagram such as Harel state, UML state diagram, Petri net, among others. Each state in the diagram corresponds to a function exposed by an external mobile service that could be used to process mobile content while in delivery. External services, frameworks and enablers, such as location, presence, delivery capabilities, user profile, among others, could be used to personalize content delivery and content presentation according to the device and user settings, user location and state. The service could have more than one function exposed.

Functions and services are identified by identifiers that could be a uniform resource identifier (URI), name, a global unique identifier (GUID), a tag, among others.

Guard expressions, action verbs, parameters and results are expressed in terms defined by the schema of the delivery enabler and delivery framework, and/or by the schema of the particular external service. The delivery enabler schema defines XML elements understood by the delivery enabler and includes predefined bindings to external enabler functions and parameters. The schema for the external enabler defines additional parameters that could assist processing of mobile content by the external enabler. These parameters are opaque to the delivery enabler and embedded inside the delivery enabler metadata using an XML schema extension mechanism.

The delivery enabler can be on either the device side or the service side, as indicated above. In a further embodiment, all server functionality may be moved to the device side, and thus only a device side could exist for the delivery enabler.

Figure 7:
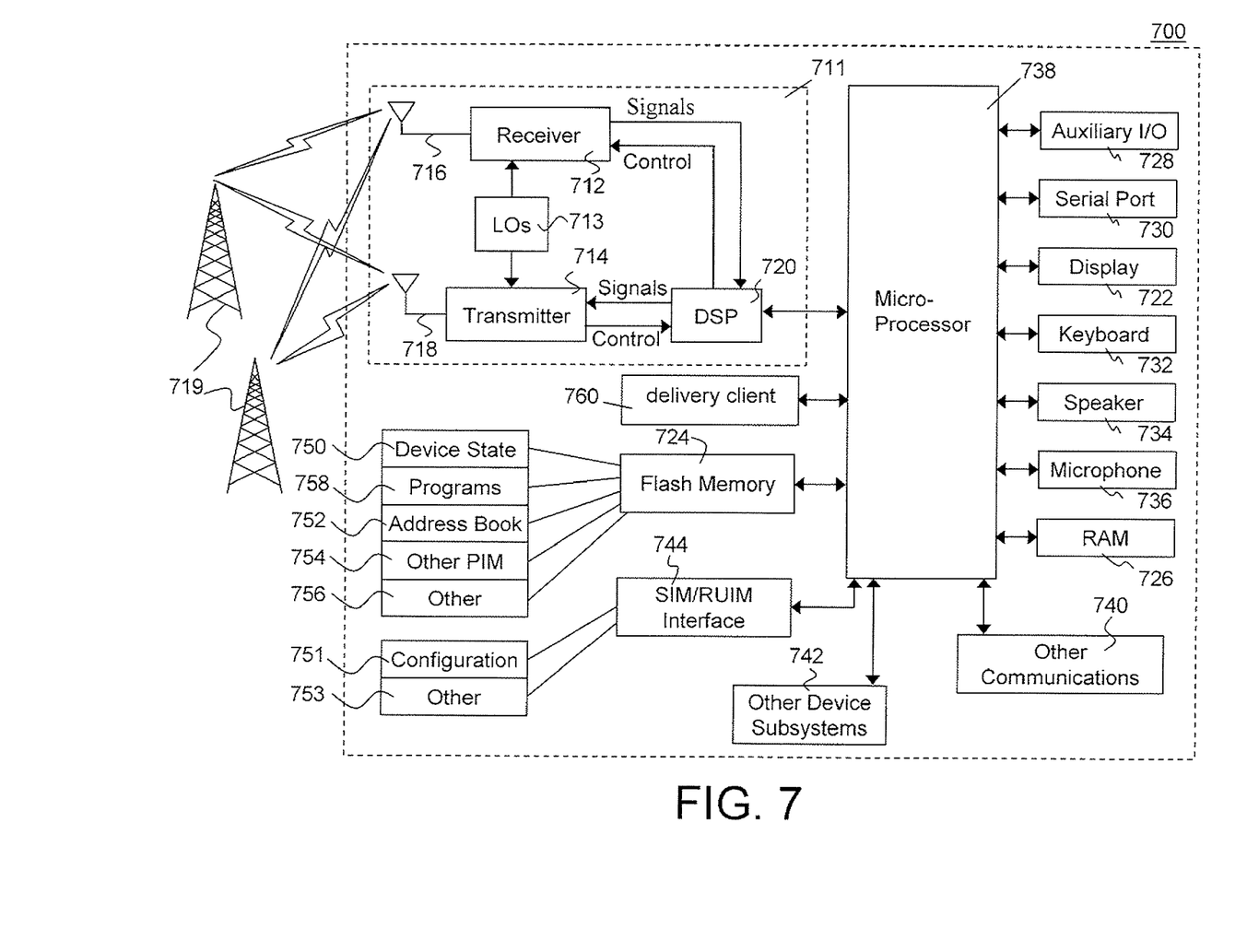
FIG. 7 is a block diagram showing an exemplary mobile device that can be used in associate with the method and system of the present disclosure.

The delivery client and content client can be found on any mobile device. One particular mobile device that is illustrated as an example is provided in FIG. 7. Reference is now made to FIG. 7.

FIG. 7 is a block diagram illustrating a mobile station apt to be used with preferred embodiments of the apparatus and method of the present application. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some CDMA networks network access is associated with a subscriber or user of mobile station 700. A CDMA mobile station may require a removable user identity module (RUIM) or a subscriber identity module (SIM) card in order to operate on a CDMA network. The SIM/RUIM interface 744 is normally similar to a card-slot into which a SIM/RUIM card can be inserted and ejected like a diskette or PCMCIA card. The SIM/RUIM card can have approximately 64K of memory and hold many key configuration 751, and other information 753 such as identification, and subscriber related information.

When required network registration or activation procedures have been completed, mobile station 700 may send and receive communication signals over the network 719. As illustrated in FIG. 7, network 719 can consist of multiple base stations communicating with the mobile device. For example, in a hybrid CDMA 1×EVDO system, a CDMA base station and an EVDO base station communicate with the mobile station and the mobile station is connected to both simultaneously. The EVDO and CDMA 1× base stations use different paging slots to communicate with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. Other applications could be installed subsequently or dynamically.

A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A delivery client 760, which could be equivalent to delivery client 140 could also process the input.

A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for coordinating content processing in a mobile delivery framework comprising the steps of:
    embedding, within a metadata envelope associated with content, external references to external enablers and metadata for a delivery enabler that is different from the external enabler; and
    inserting, into the metadata, content processing coordination rules for engaging the functionality of the external enablers for processing the content by the delivery enabler.

2. The method of claim 1, wherein the content processing coordinating rules are an extensible mark-up language (XML) packaged state chart.

3. The method of claim 2, wherein the XML packaged state chart comprises a function block with embedded layers.

4. The method of claim 3, wherein the embedded layers comprise a first layer defining common XML elements; a second layer defining metadata for a delivery enabler having bindings to external enablers; and a third layer defining metadata for external enablers.

5. The method of claim 4, wherein the third layer is opaque to the delivery enabler.

6. The method of claim 4, wherein the second layer comprises expressions, instructions or parameters having a predefined behaviour including binding of the expressions, instructions or parameters onto functions of the external enabler.

7. The method of claim 4, wherein the first layer is referenced by a namespace defining XML syntax for a state chart representation language.

8. The method of claim 3, wherein the function block contains one or more of:
    a state identifier; a guard expression; an external service identifier; an action verb; a
    parameter; and a state transition.

9. The method of claim 8, wherein the action verb is used to map coordination instructions to enabler functions.

10. The method of claim 9, wherein the mapping is performed by a metadata interpretation layer.

11. The method of claim 8, wherein the state transition is based on a result received from using an action verb to invoke an external function.

12. The method of claims 1, wherein the external references are namespace declarations for external services.

13. The method of claim 12, wherein the external services are selected from the group consisting of a presence service, a location service, a content screening service, and a compression service.

14. The method of claim 1, wherein said inserting step defines schemas for external enablers within an element for a processing state.

15. A system for coordination of content processing comprising:
    a content provider, said content provider adapted to embed external references to external enablers and metadata for a delivery enabler inside mobile content delivery metadata associated with content supplied by said content provider, and to insert into the metadata for a delivery enabler content processing coordination rules in order to engage the functionality of the referenced external enablers for processing the content by the delivery enabler;
    a content delivery enabler comprising:
        a delivery server, said delivery server adapted to process metadata directed to said delivery server; and
        a delivery client, said delivery client adapted to process metadata directed to said delivery client;
    external enablers adapted to process content based on the content processing coordination rules through said content delivery enabler; and
    a content client adapted to consume content from the content provider.

16. A content package comprising:
    content; and
    a metadata envelope, the metadata envelope comprising external references to external enablers and metadata for a deliver enabler, the metadata for a delivery enabler including content processing coordination rules embedded therein for engaging a functionality of the external enablers for processing the content by the delivery enabler.

17. The content package of claim 16, wherein the content processing coordinating rules are an extensible mark-up language (XML) packaged state chart.

18. The content package of claim 17, wherein the XML packaged state chart comprises a function block with embedded layers.

19. The content package of claim 18, wherein the embedded layers comprise a first layer defining common XML elements; a second layer defining metadata for a delivery enabler having bindings to external enablers; and a third layer defining metadata for external enablers.

20. The content package of claim 19, wherein the third layer is opaque to the delivery enabler.

21. The content package of claim 19, wherein the second layer comprises expressions, instructions or parameters having a predefined behaviour including binding of the expressions, instructions or parameters onto functions of the external enabler.

22. The content package of claim 19, wherein the first layer is referenced by a namespace defining XML syntax for a state chart representation language.

23. The content package of claim 18, wherein the function block contains one or more of: a state identifier; a guard expression; an external service identifier; an action verb; a parameter; and a state transition.

24. The content package of claim 23, wherein the action verb is adapted to be used to map coordination instructions to enabler functions.

25. The content package of claim 16, wherein the external references are namespace declarations for external services.

26. The content package of claim 25, wherein the external services are selected from the group consisting of a presence service, a location service, a content screening service, and a compression service.

27. The content package of claim 16, further comprising schemas for external enablers within an element for a processing state.

* * * * *